(12) United States Patent
Noji

(10) Patent No.: US 7,397,465 B2
(45) Date of Patent: Jul. 8, 2008

(54) COORDINATE INPUT CONTROL METHOD

(75) Inventor: Minoru Noji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 10/860,362

(22) Filed: Jun. 2, 2004

(65) Prior Publication Data

US 2004/0257347 A1 Dec. 23, 2004

(30) Foreign Application Priority Data

Jun. 20, 2003 (JP) ............................. 2003-176928

(51) Int. Cl.
*G06F 3/041* (2006.01)
(52) U.S. Cl. ...................... 345/173; 345/175; 345/179; 345/180; 178/18.01
(58) Field of Classification Search ......... 345/173–180; 178/18.01–18.04
See application file for complete search history.

(56) References Cited

U.S. PATENT DOCUMENTS 6,689,965 B1 * 2/2004 Fleck ....................... 178/18.01
2002/0145595 A1 * 10/2002 Satoh .......................... 345/173
2002/0186210 A1 * 12/2002 Itoh ............................ 345/173
2003/0001825 A1 * 1/2003 Omura et al. ................ 345/173

FOREIGN PATENT DOCUMENTS

| JP | 60-175191 A | 9/1985 |
| JP | 06-059802 A | 3/1994 |
| JP | 06-131110 A | 5/1994 |
| JP | 07-168664 A | 7/1995 |

* cited by examiner

*Primary Examiner*—Richard Hjerpe
*Assistant Examiner*—Kimnhung Nguyen
(74) *Attorney, Agent, or Firm*—Canon U.S.A. Inc., IP Division

(57) ABSTRACT

A coordinate input control method is used in a display-integrated coordinate input apparatus which includes a display having thereon a first area and a second area, and a single coordinate-input unit, and in which the coordinate input means inputs coordinates on the display. The method determines if the coordinates input by the coordinate input unit are on the second area. When it is determined that the input coordinates are on the second area, it is determined whether the coordinates on the second area have been consecutively input since processing on the first area. When it is determined that the coordinates have been consecutively input, designation of processing on the second area is nullified.

15 Claims, 11 Drawing Sheets

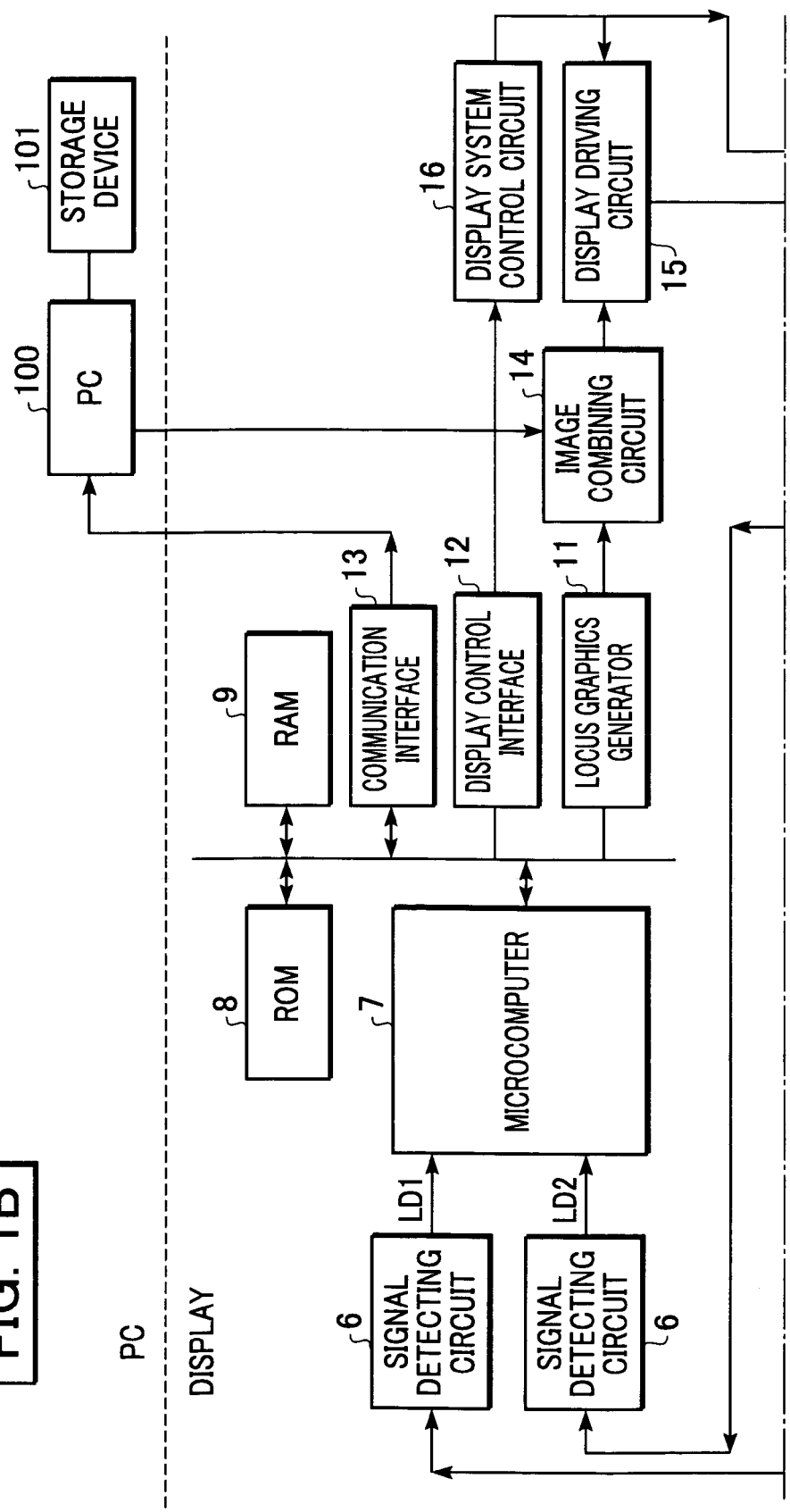

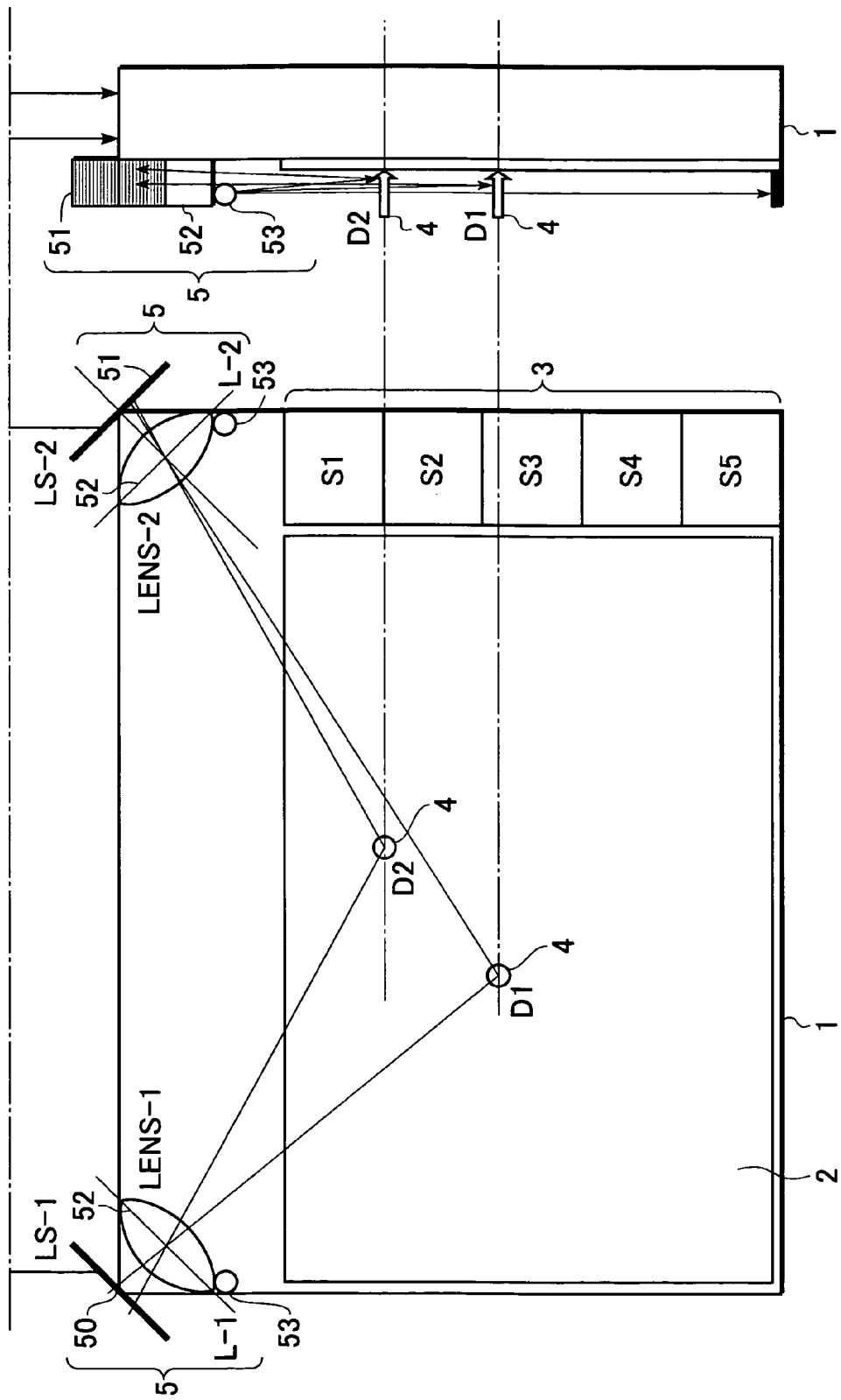

| FIG. 7A |
| FIG. 7B |

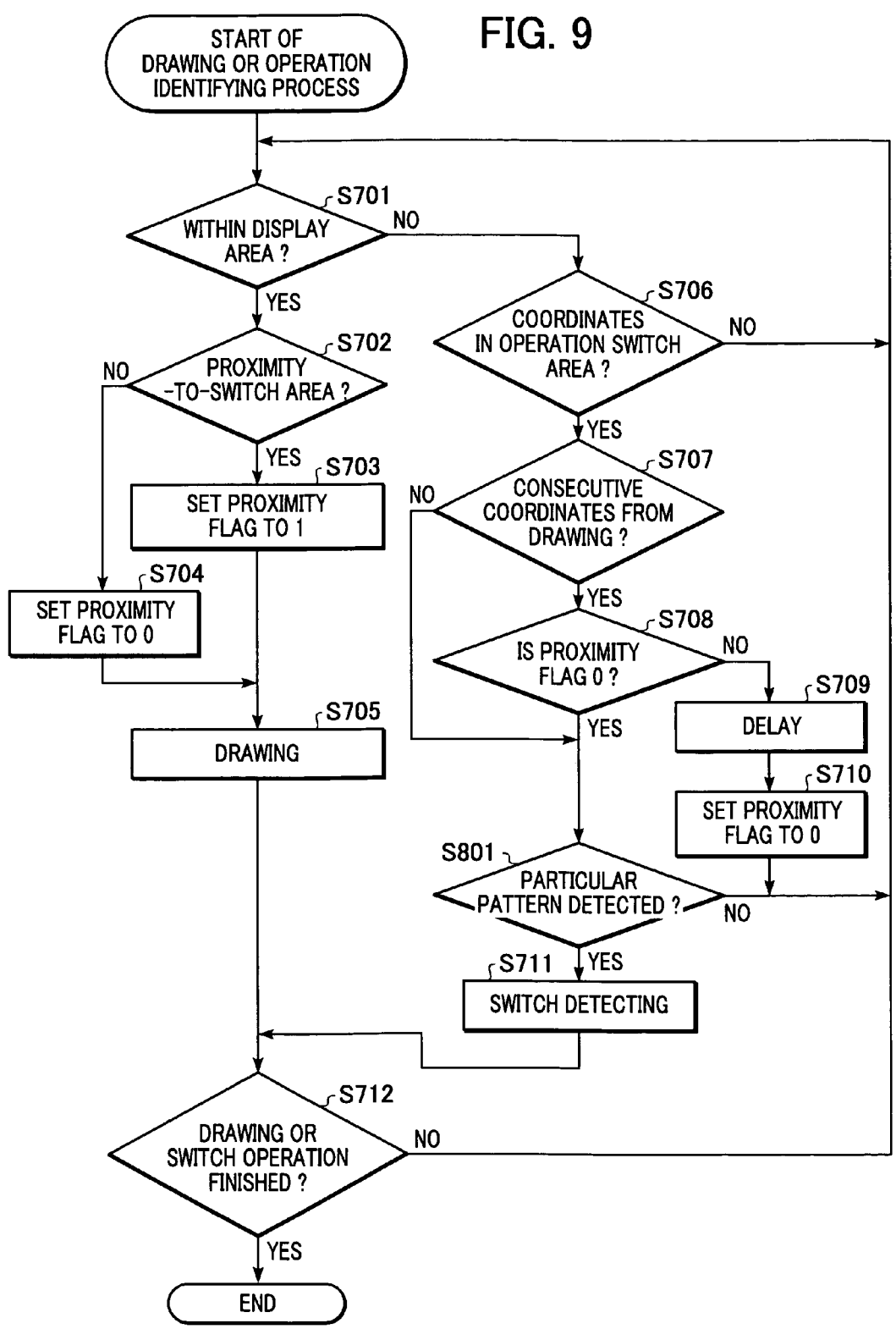

COORDINATE INPUT CONTROL METHOD

BACKGROUND OF THE INVENTION

1. Field of the Invention

The present invention relates to coordinate input control in a display-integrated coordinate input apparatus which includes a display having a drawing area and an operation area thereon, and in which drawing and operation instructions are input on the display by using a single coordinate input unit.

2. Description of the Related Art

A display-integrated drawing input apparatus has been known which includes a display unit and a coordinate input mechanism (digitizer). The coordinate input mechanism uses the display unit, whose screen has a drawing area and an operation detecting area (hereinafter referred to as an "operation area"). The operation area is next to the drawing area and functions as operation switches.

When, in the above apparatus, the operation area on a side of the screen is constituted by a plurality of operation switch areas and is realized by an operation input unit identical to that in a digitizer, by mounting electronic components, such as tactile switches and connectors corresponding to various functions, on a printed circuit board, the large cost required to install wiring in the housing of the apparatus by using connecting cords can be saved. Accordingly, the mounting of the electronic components has an advantage in that the operation switch forming cost can be reduced.

In a case in which the screen of the display has the drawing area and the operation area at adjacent positions, as described above, when drawing is performed by means of drawing such as a user's finger or a drawing pen, if the means of drawing mistakenly protrudes from the drawing area into the operation area, it is determined that a switch operation has been designated, thus resulting in an operation mistake.

In addition, in many cases, the display-integrated drawing input apparatus employs a system in which a coordinate input unit of the digitizer emits infrared radiation almost in parallel to the surfaces of the drawing area and the operation area on the display unit and coordinate detection is performed by using infrared radiation reflected by the means of drawing such as the user's finger or drawing pen. In this system, after the means of drawing temporarily loses contact with the drawing area and the operation area, when an intended operation is performed again, a zone in which coordinate detection is performed by using the infrared radiation extends to a relatively broad region positioned away from the drawing area and the operation area. Thus, separation of the means of drawing cannot be detected, so that a state in which intended drawing and operation cannot be performed occurs.

SUMMARY OF THE INVENTION

In order to solve the above problem, the present invention enables a display-integrated drawing input apparatus to perform drawing and operations intended by a user, whereby operability of the apparatus is enhanced.

According to an aspect of the present invention, a coordinate input control method for a display-integrated coordinate input apparatus is provided. The method uses a display having thereon a first area and a second area, and a coordinate-input unit that inputs coordinates on the display. The coordinate input control method determines if the coordinates input by the coordinate input unit are on the second area. If the input coordinates are on the second area, the method determines whether the coordinates on the second area have been consecutively input since processing on the first area. If it is determined that the coordinates on the second area have been consecutively input, the method nullifies designation of processing on the second area.

In accordance with an aspect of the present invention, the first area is a drawing area and processing on the first area is drawing, and the second area includes at least one switch and processing on the second area is an operation on a respective one of the switches on the second area.

In accordance with another aspect of the present invention, the coordinate input control method determines if the coordinates on the second area have been consecutively input based on a predetermined number of coordinates input in an adjacent past prior to the coordinates on the second area.

In accordance with yet another aspect of the present invention, the coordinate input control method executes an operation on the respective switch when the coordinates on the second area have not been consecutively input since the drawing on the first area.

In accordance with yet another aspect of the present invention, a region on the first area in proximity to the second area is set as a proximity area. The coordinate input control method determines if the coordinates on the second area have been consecutively input since drawing on the proximity area. If it is determined that the coordinates on the second area have been consecutively input since drawing on the proximity area, detection of an operation on the switch is delayed for a predetermined amount of time. After the detection of the operation on the switch is delayed for the predetermined amount of time, if the coordinates on the second area represent designation of the operation on the switch, the operation of the switch is executed.

In accordance with still another aspect of the present invention, executing the operation of the switch is performed when the coordinates on the second area represent a particular pattern. The particular pattern may be a pattern of a particular shape. The particular pattern may be information of a vector from the second area to the first area. The particular pattern may be vector information different from information of a vector from the first area to the second area.

According to another aspect of the present invention, a display-integrated coordinate input apparatus is provided. The display-integrated coordinate input apparatus includes a display having thereon a first area and a second area. The display-integrated coordinate input apparatus also includes a coordinate-input unit for inputting coordinates on the display. The display-integrated coordinate input apparatus further includes a determining unit for determining whether or not the coordinates input by the coordinate input unit are on the second area. The display-integrated coordinate input apparatus also includes a consecutiveness determining unit for determining, when the determining unit determines that the input coordinates are on the second area, whether the coordinates on the second area have been consecutively input since processing on the first area. Furthermore, the display-integrated coordinate input apparatus includes a nullifying unit for nullifying designation of processing on the second area when the consecutiveness determining unit determines that the coordinates on the second area have been consecutively input.

In accordance with an aspect of the present invention, the first area and the second area are provided on substantially the same plane of the display.

In accordance with another aspect of the present invention, the display-integrated coordinate input apparatus further includes drawing means, and the coordinate input means emits radiation substantially parallel to the surfaces of the first area and the second area and performs coordinate detection based on radiation reflected by the drawing means.

According to another aspect of the present invention, a control program for controlling a display-integrated coordinate input apparatus is provided. The display-integrated coordinate input apparatus includes a display having thereon a first area and a second area, and a coordinate-input unit for inputting coordinates on the display. The control program is loaded and executed in a computer, and the above coordinate input control method is implemented for the display-integrated coordinate input apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing a display-integrated drawing input apparatus according to a first embodiment of the present invention.

FIG. 9 is a flowchart showing a switch operation identifying process according to a third embodiment of the present invention.

DESCRIPTION OF THE PREFERRED EMBODIMENTS

Figure 2:
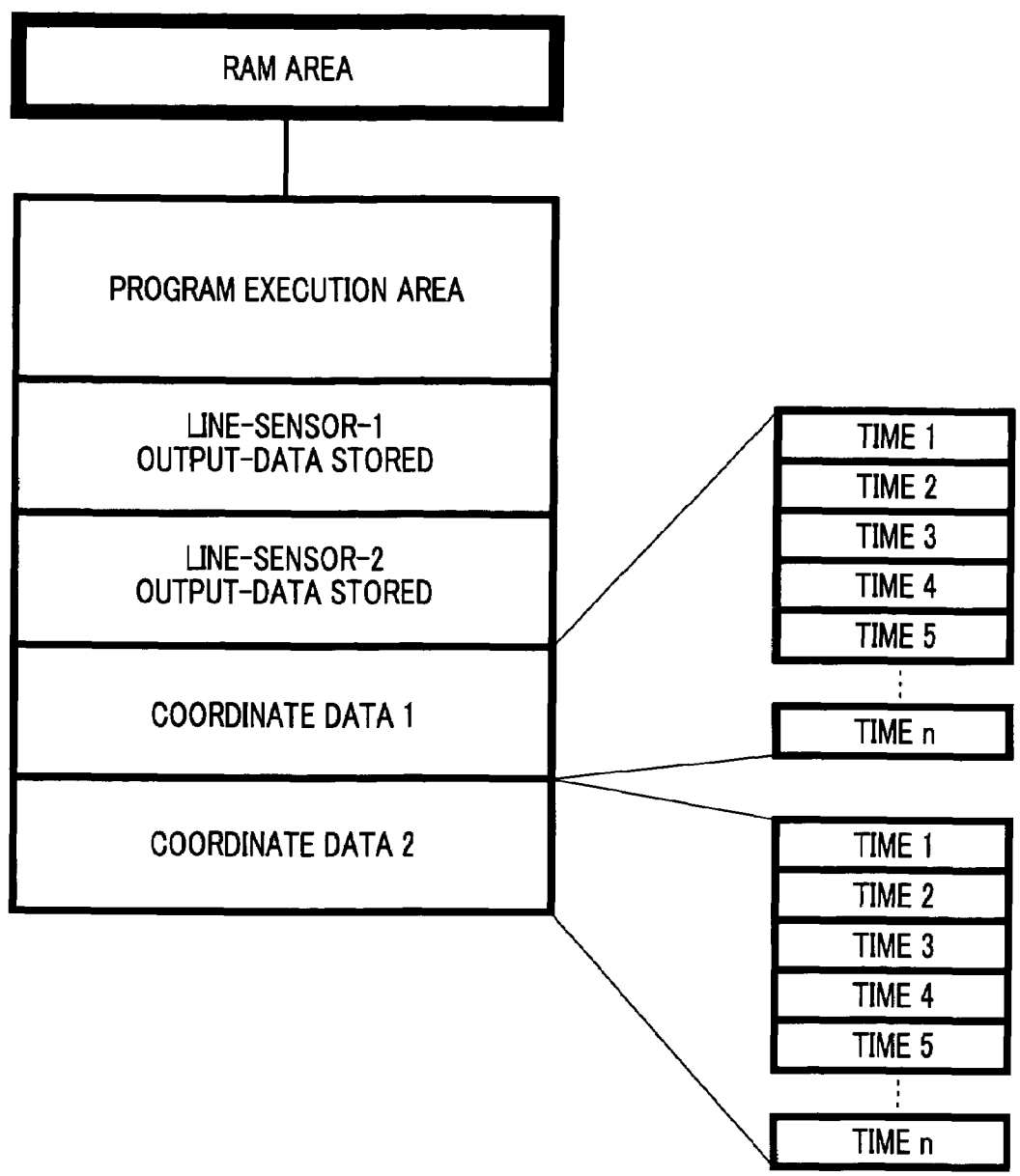
FIG. 2 is an illustration of a data configuration in a random access memory (RAM) according to the first embodiment of the present invention.

Exemplary embodiments of the present invention are described in detail below with reference to the accompanying drawings.

First Embodiment

FIG. 1 (FIGS. 1A and 1B) is a block diagram showing the configuration of a display-integrated drawing input apparatus according to a first embodiment of the present invention. FIGS. 1A and 1B show a display 1, a screen section 2 which is a display screen of the display 1 and is also a drawing area, an operation area 3 used as an operation switch panel, a drawing pen 4, and photo-sensor units 5.

The apparatus includes signal detecting circuits 6, a microcomputer 7, a read-only memory (ROM) 8, a random access memory (RAM) 9, a locus graphics generator 11, a display control interface 12, a communication interface 13, an image combining circuit 14, a display driving circuit 15, and a display system control circuit 16. Also, FIG. 1A shows a personal computer (PC) 100 and a storage device 101 (hereinafter also referred to as an "HDD") connected to the PC 100.

Each of the photo-sensor units 5 includes a line sensor-1 50, a line sensor-2 51, an image-forming cylindrical lens 52, and an infrared radiation source 53.

In the configuration shown in FIG. 1, the display 1 uses the image combining circuit 14 and the display driving circuit 15 to display, on the screen section 2, a picture based on a picture signal output from the PC 100.

In the first embodiment, the operation area 3 is provided, as an operation switch panel, next to the screen section 2 on the display 1. The operation area 3 is divided into switching areas. In the example shown in FIG. 1B, there are five switching areas S1 to S5. The operation area 3 is almost coplanar with the screen section 2 and only differs from the screen section 2 in that the switching areas S1 to S5 are indicated by, for example, printed representations S1 to S5.

The photo-sensor units 5 are disposed at right and left sides on the top end of the screen section 2 on the display 1. Each infrared radiation source 53 on each of right and left sides emits infrared radiation in a sector form and in parallel to the surface of the screen section 2. The emitted infrared radiation is reflected by the drawing pen 4 when it is positioned on the screen section 2. In the first embodiment, the drawing pen 4 includes a user's finger. The infrared radiation reflected by the drawing pen 4 is focused on the photo-receiving surfaces of the line sensors 50 and 51 of each photo-sensor unit 5.

Each of the line sensors 50 and 51 one-dimensionally captures the focused image drawn by using the drawing pen 4. The signal detecting circuits 6 perform waveform processing on the captured images. The processed images are input, as molding data LD1 and LD2, each of which is formed of positional data and amplitude data, to the microcomputer 7. The microcomputer 7 stores the input molding data LD1 and LD2 in the RAM 9. The microcomputer 7 generates data called "Drawing-pen-position Coordinate Time 1" by performing coordinate determination calculation based on the positional data of the molding data LD1 and LD2, and stores the generated "Drawing-pen-position Coordinate Time 1" in the RAM 9. Then, by referring to the "Drawing-pen-position Coordinate Time 1" data stored in the RAM 9, the locus graphics generator 11 generates locus graphics corresponding to the calculated coordinates.

As the drawing pen 4 moves with time, "Drawing-pen-position Coordinate Time 2" data, "Drawing-pen-position Coordinate Time 3" data, . . . , "Drawing-pen-position Coordinate Time n" data are sequentially generated and stored in the RAM 9 by the microcomputer 7.

FIG. 2 shows an example of the memory configuration of the RAM 9. As shown in FIG. 2, the RAM 9 stores data in a program execution area used by the microcomputer 7. The RAM 9 also stores data (the above molding data LD1 and LD2) output from the line sensor-1 50 and the line sensor-2 51, and coordinate time data calculated based on the output data.

The locus graphics generator 11 outputs graphics corresponding to coordinates represented by each "Drawing-pen-position Coordinate Time". The image combining circuit 14 combines the output graphics with a PC picture signal output from the PC 100, and the display driving circuit 15 displays the resultant consecutive locus on the screen section 2.

Figure 3:
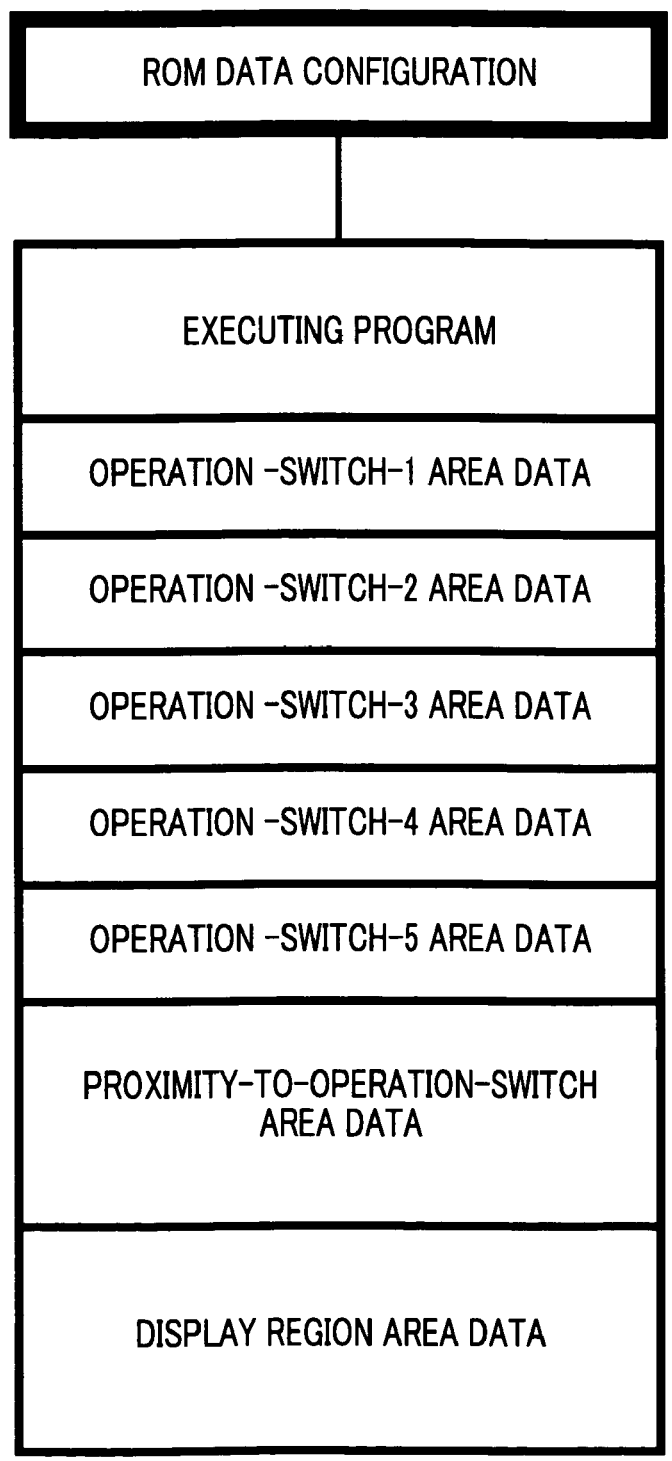
FIG. 3 is an illustration of a data configuration in a read-only memory (ROM) according to the first embodiment of the present invention.

Also, in order to set an operation of the display 1, when, for example, the switching area S2 in the operation area 3, is designated by using the drawing pen 4, it is determined whether detected coordinate data from the microcomputer 7 and operation-switch area data stored in the ROM 8 match each other. FIG. 3 shows an example of the memory configuration of the ROM 8. The ROM 8 stores programs executed by the microcomputer 7, coordinate data representing the switches S1 to S5 in the operation area 3, coordinate data representing areas in proximity to the operation switches S1 to S5, and data of coordinates on the screen section 2.

A drawing or switch operation identifying process in the first embodiment is described below with reference to the flowchart shown in FIG. 5.

Figure 4:
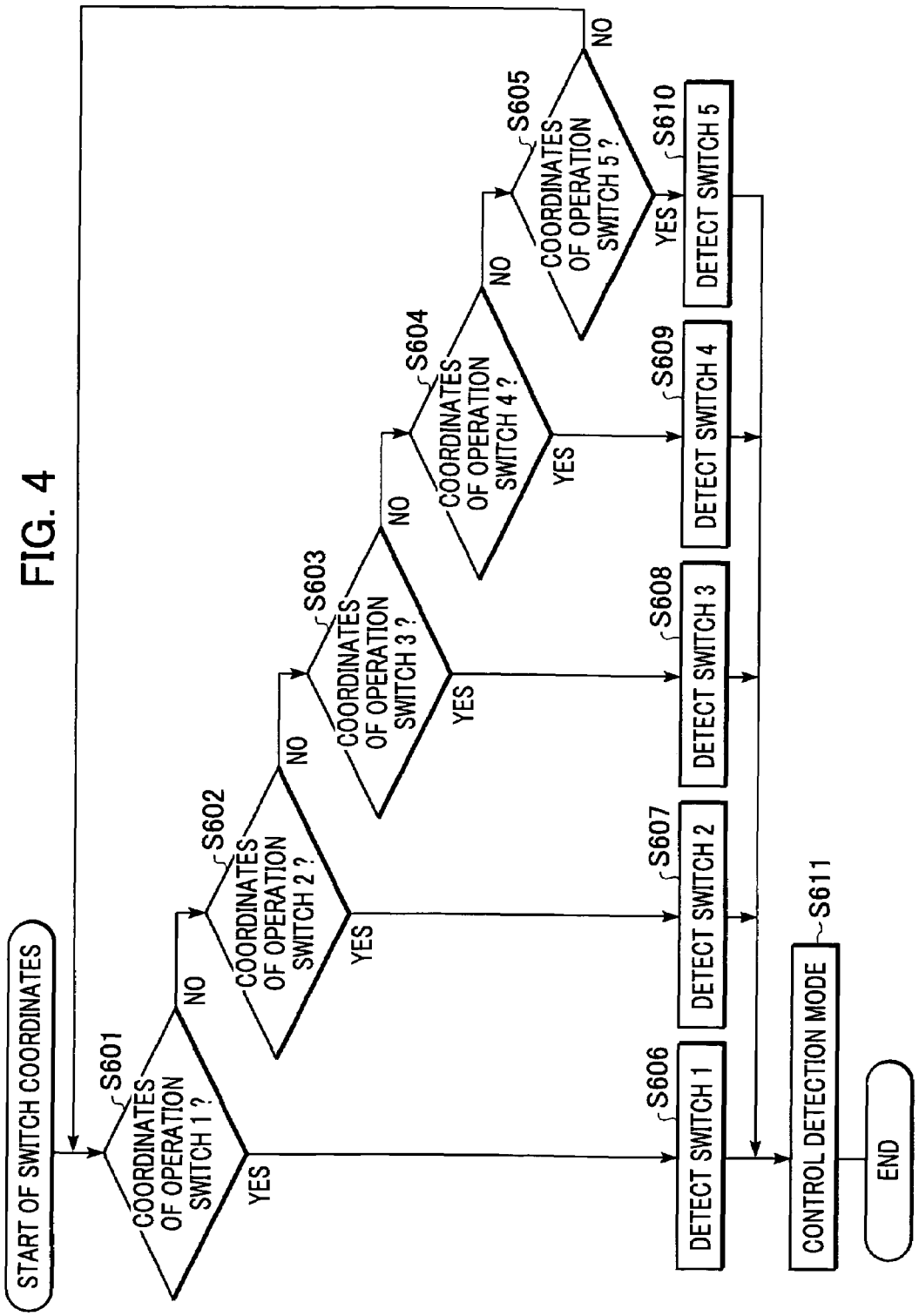
FIG. 4 is a flowchart showing a switch coordinate detecting process according to the first embodiment of the present invention.

If the coordinates designated by using the drawing pen 4 are within the screen section 2, which is used as a display area, the above-described drawing is performed (steps S501 and S502). If the designated coordinates are not within the screen section 2, it is determined whether the designated coordinates are within the operation area 3 (step S503). If the designated coordinates are within the operation area 3, by referring to coordinate data for a predetermined number of samples detected in the adjacent past, it is determined whether the designated coordinates at the present in the operation area 3 are regarded as consecutive coordinates from the coordinates of the samples in the adjacent past (step S504). If it is determined that the designated coordinates at the present in the operation area 3 are not regarded as consecutive coordinates, the display 1 switches to an operation switch mode, and the switch detecting is used to perform detection to determine which switch in the operation area 3 is designated by the drawing pen 4 (step S505). FIG. 4 illustrates a method of switch detecting and is described next.

Figure 5:
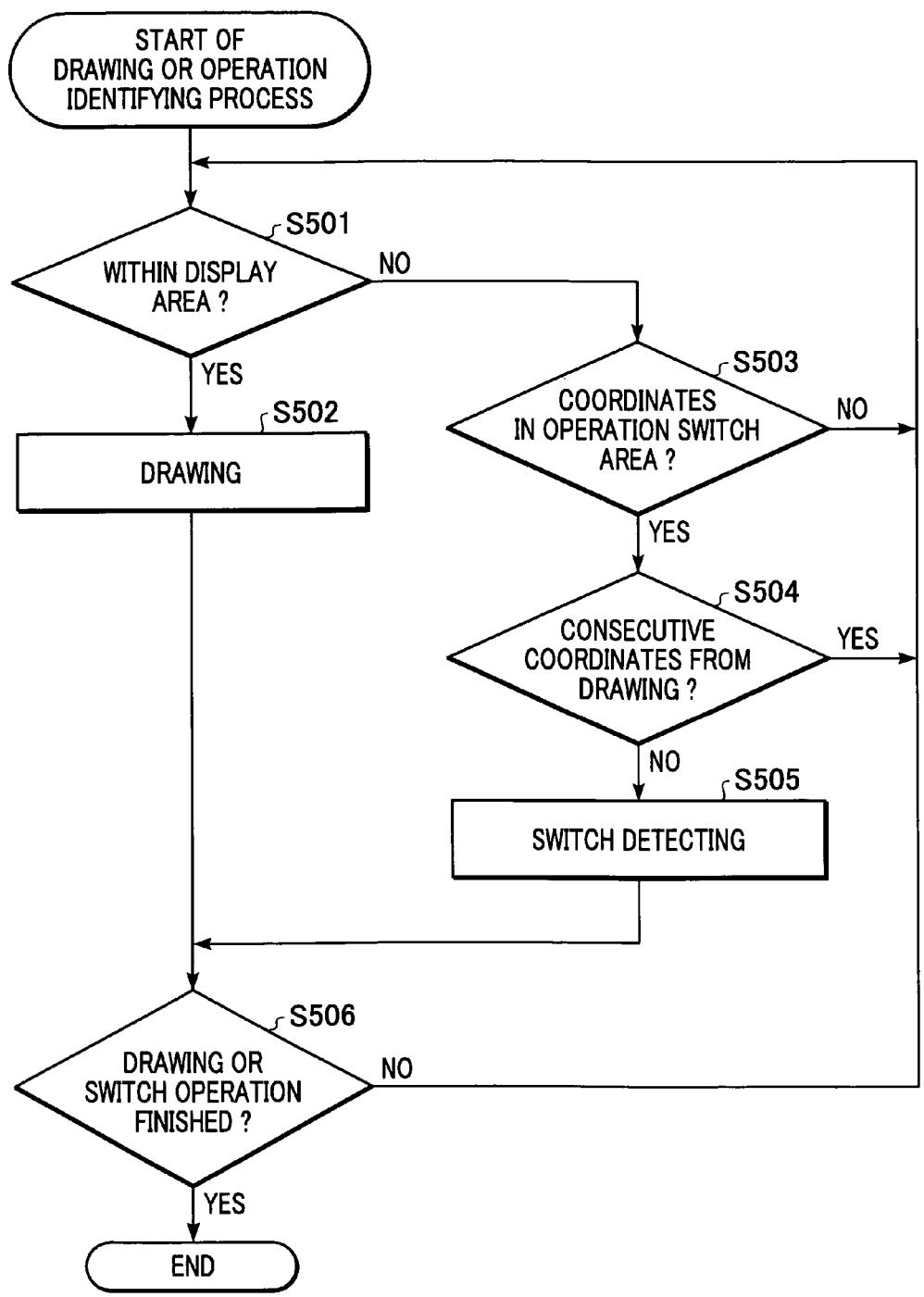
FIG. 5 is a flowchart showing a switch operation identifying process according to the first embodiment of the present invention.

FIG. 4 is a flowchart showing a switch coordinate detecting process (step S505 of FIG. 5).

When a switch (S1, S2, S3, S4 or S5) in the operation area 3 is designated by the drawing pen 4, it is determined which one of the operation switches S1 to S5 has coordinate data (in the ROM 8) including the detected coordinate data (steps S601 to S605). Based on which of the operation switches has coordinate data (step S601 to step S605), the designated switch is detected (step S606 to S610). After switch detection of any of the switches S1-S5 (step S606 to step S610), control detection mode is entered (step S611). The microcomputer 7 can control functions of the screen section 2 by outputting an operation mode associated with the detected switch to the display system control circuit 16 through the display control interface 12. In other words, the screen section 2 is controlled as the user intends to designate by using the drawing pen 4.

A case in which the drawing pen 4 unintentionally enters any of the switching areas S1 to S5 in the operation area 3 while being used to perform drawing on the screen section 2 is described below. In this case, in the first embodiment, the display-integrated drawing input apparatus is controlled as described below.

When the microcomputer 7 detects the drawing pen 4 entering the operation area 3, it determines whether the detected coordinates are consecutive coordinates from the screen section 2 by referring to a detected coordinate position of the drawing pen 4 in the adjacent past corresponding to, for example, five samples. If the microcomputer 7 has determined that the detected coordinates are consecutive coordinates, it determines that the drawing pen 4 has unintentionally entered the operation area 3, and refuses processing in an operation mode associated with the detected switch.

Referring to FIG. 5, when it is determined that the designated coordinates are determined to be consecutive coordinates, that is, the drawing pen 4 has been consecutively moved since drawing on the screen section 2 (yes in step S504), the process returns to step S501 without performing switch detecting in step S505.

Finally, after performing drawing (step S502) or after performing switch detecting (step S505), it is determined whether the drawing or the switch operation has been finished (step S506). If the drawing or the switch operation has been finished, the process ends. If not, the process returns to step S501.

As described above, according to the first embodiment, even if the drawing pen 4 unintentionally enters the operation area 3 while being used to perform drawing on the screen section 2, the display 1 can be prevented from switching to the operation switch mode. This improves operability.

Second Embodiment

A second embodiment of the present invention is described below.

Figure 6:
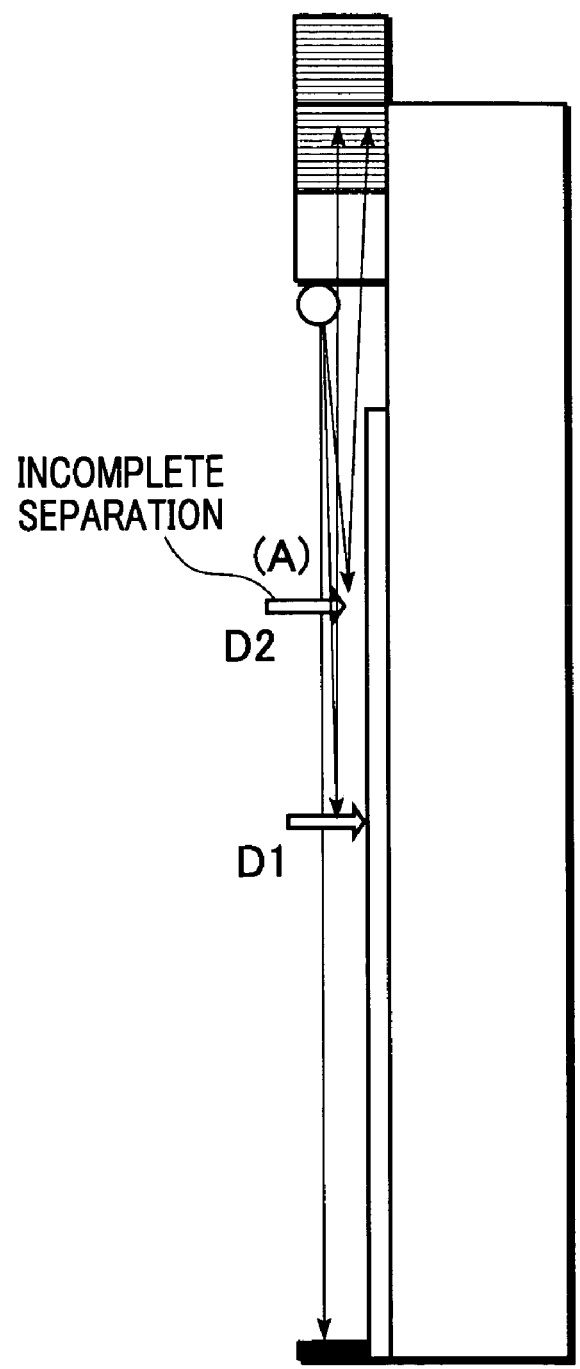
FIG. 6 is a side view of a display unit which illustrates incomplete separation of an operation pen according to a second embodiment of the present invention.

In the above first embodiment, in the case of performing an operation on the operation area 3 after the drawing pen 4 is temporarily separated from the surface of the screen section 2 while being used to perform drawing, if the drawing pen 4 is not sufficiently separated from the infrared detection zone and is in the "Incomplete Separation" state shown in FIG. 6, the state is recognized as consecutive drawing. This is because the drawing pen 4 is detected if only to respond to the infrared radiation (used as detection radiation), even if it does not firmly touch the screen section 2. According to the first embodiment, in this case, an operation-detection prohibiting process of the operation area 3 functions to prohibit switching of drawing in the screen section 2 (as a drawing area) to a switch operation on the operation area 3. This results in a problem in that a switch operation intended by the user may not be detected.

Accordingly, the second embodiment is intended to solve the above problem of no detection of the switch operation, whereby more appropriate detection of a switch operation can be performed.

Figures 7, 7A:
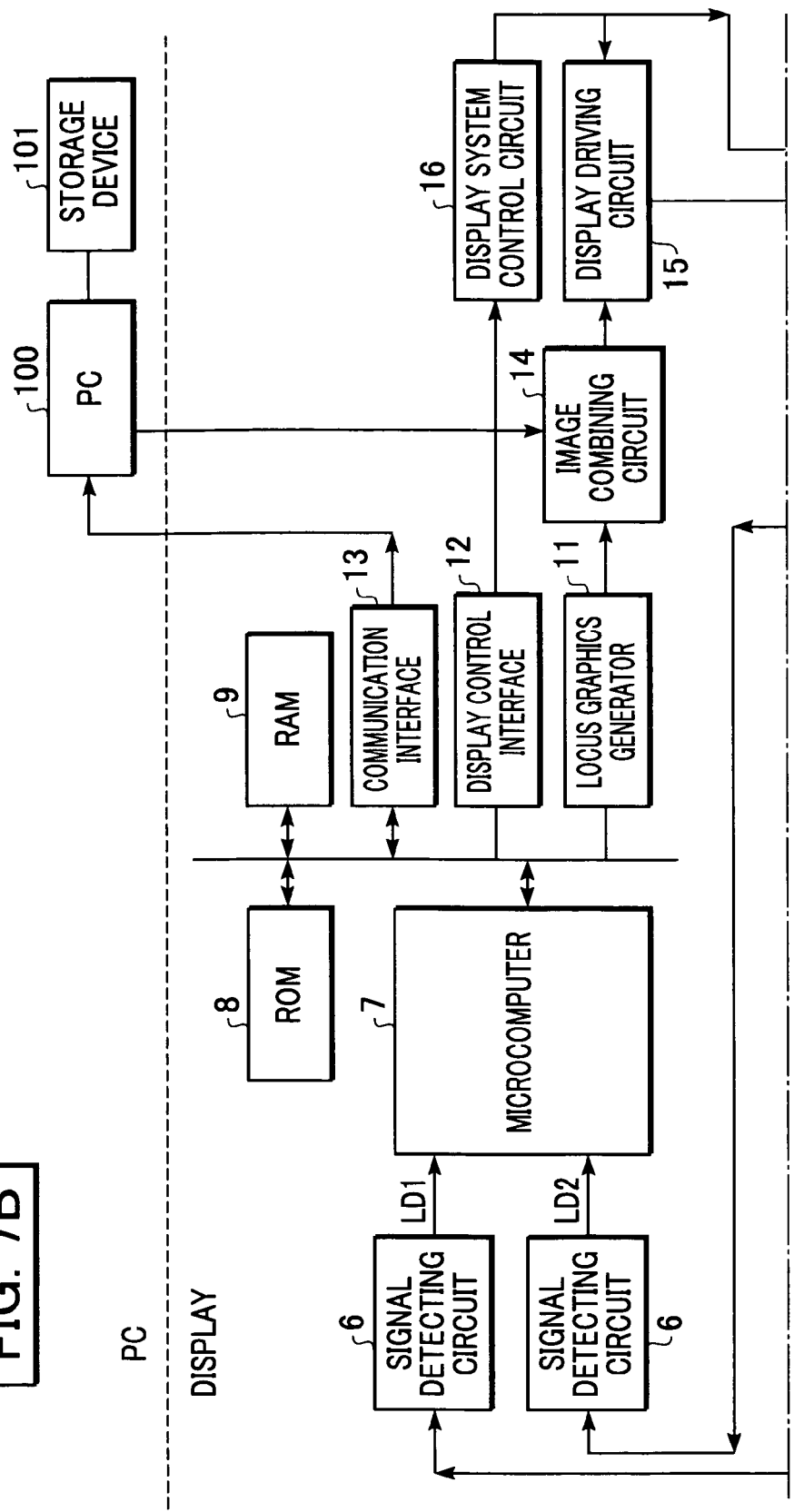
FIG. 7 is a block diagram showing a display-integrated drawing input apparatus according to the second embodiment of the present invention.

FIG. 7 (FIGS. 7A and 7B) is a block diagram showing a display-integrated drawing input apparatus according to the second embodiment. Descriptions of components similar to those in the first embodiment shown in FIG. 1 are omitted since the components are denoted by identical reference numerals and are described above. In the second embodiment, a proximity-to-operation area 200 is provided on the screen section 2 adjacent to the operation area. Coordinate data which represents the position of the proximity-to-operation area 200 is stored in the ROM 8, as shown in FIG. 3.

In the second embodiment, if the drawing pen 4 is used to perform drawing in the proximity-to-operation area 200, detection of an operation on one operation switch in the operation area 3 is stopped during predetermined time T.

Figure 8:
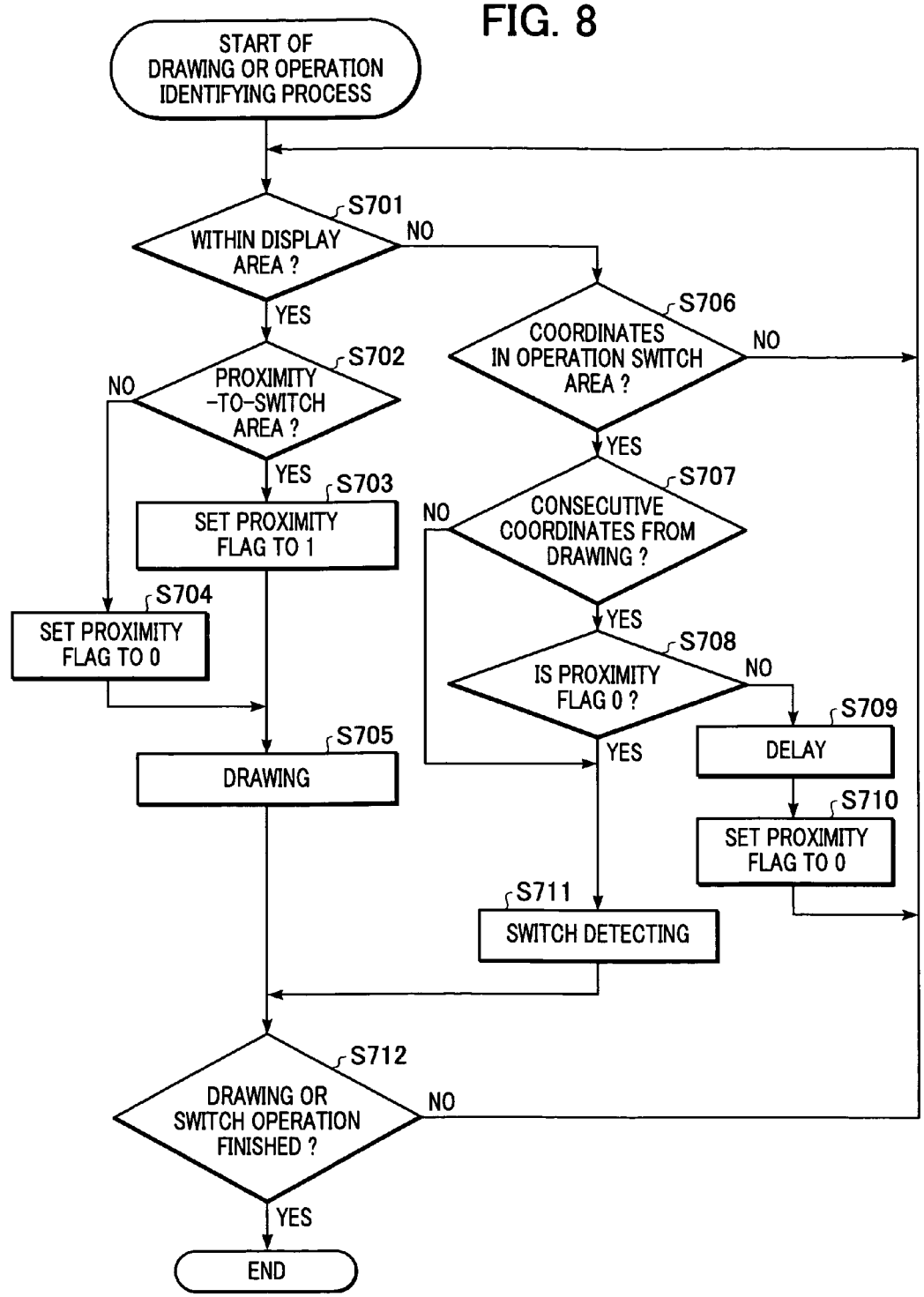
FIG. 8 is a flowchart showing a switch operation identifying process according to the second embodiment of the present invention.

The operation identifying process in the second embodiment is described below with reference to the flowchart shown in FIG. 8. The operation identifying process is executed such that the microcomputer 7 loads an executing program stored in the ROM 8 into the program execution area of the RAM 9.

First, in step S701, it is determined whether data of coordinates designated by drawing pen 4 are within the display area 2. If so, it is determined whether data of coordinates designated by the drawing pen 4 are within the proximity-to-operation area 200 (step S702). Specifically, the determination is performed by comparing drawing coordinate data calculated by the microcomputer 7 with data in the proximityto-operation area 200. If it is determined that the data of coordinates designated by the drawing pen 4 are within the proximity-to-operation area 200, a proximity flag is set to "1" (step S703). If the data of coordinates designated by the drawing pen are in the display area 2 (yes in step S701), but not within the proximity-to-operation area 200 (no in step S702), the proximity flag is set to "0" (step S704). After the proximity flag has been set (to "1" in step S703 or to "0" in step S704), drawing on the screen section 2 is performed in step S705.

If, in step S701, it is determined that data of coordinates designated by drawing pen 4 are not within the display area 2 (no in step S701), the drawing pen 4 has come off the screen section 2 (the display area) and it is determined whether the data of coordinates designated by the drawing pen 4 are in the operation area 3 (step S706). If so, in step S707, reference is made to coordinate data for a predetermined number of samples detected in the adjacent past in order to determine whether the present coordinates are regarded as consecutive coordinates from the coordinates of the samples in the adjacent past. When it is determined that the present coordinates are regarded as adjacent coordinates, that is, the drawing pen 4 has been consecutively moved since drawing on the screen section 2, it is determined (in step S708) if the proximity flag is "0". If so, any one switch in the screen section 2 (S1, S2, S3, S4 or S5) is detected (in step S711) using a technique similar to that in the first embodiment (FIG. 4).

Alternatively, if the proximity flag is "1" (no in step S708), delay control is performed (step S709) so that the result of detection on the operation area 3 cannot be output for a predetermined time T, and the proximity flag is reset to "0" after the predetermined time T passes (step S710). After that, the process returns to step S701 and checks the coordinates of the drawing pen 4 again. Then, if coordinates in the operation area 3 have been still designated (step S706), the switch detection operation on the operation area 3 is performed (step S711).

Finally, after drawing (step S705) or switch detection (step S711) is performed, it is determined whether the drawing or switch operation has finished (step S712). If the drawing or switch operation has finished, the process ends. If the drawing or switch operation has not finished, the process returns to step S701.

As described above, a region which is in proximity to the operation area 3 on the display 1 is set as a proximity area. If input coordinates are identified as coordinates which have been consecutively input since drawing on the proximity area, detection of an operation on one switch S1 to S5 is delayed for a predetermined time. After the delay, if the input coordinates still represent the operation on the switch, the switch operation is executed.

As described above, in the second embodiment, by using the process in a zone in proximity to the operation area 3, if coordinates representing the same area have still been designated after time T from the time the drawing pen 4 moves from the proximity-to-operation area 200 to the operation area 3, the coordinates are detected and the function of an operation switch designated by the coordinates is executed. In other words, when the drawing pen 4 moves from the proximity-to-operation area 200 to the operation area 3, if designation in the operation area 3 by the drawing pen 4 has continued for time T or greater, it is determined that the user definitely intends to designate a switch, and the switch operation is detected.

Third Embodiment

A third embodiment of the present invention is described below.

Figure 7B:
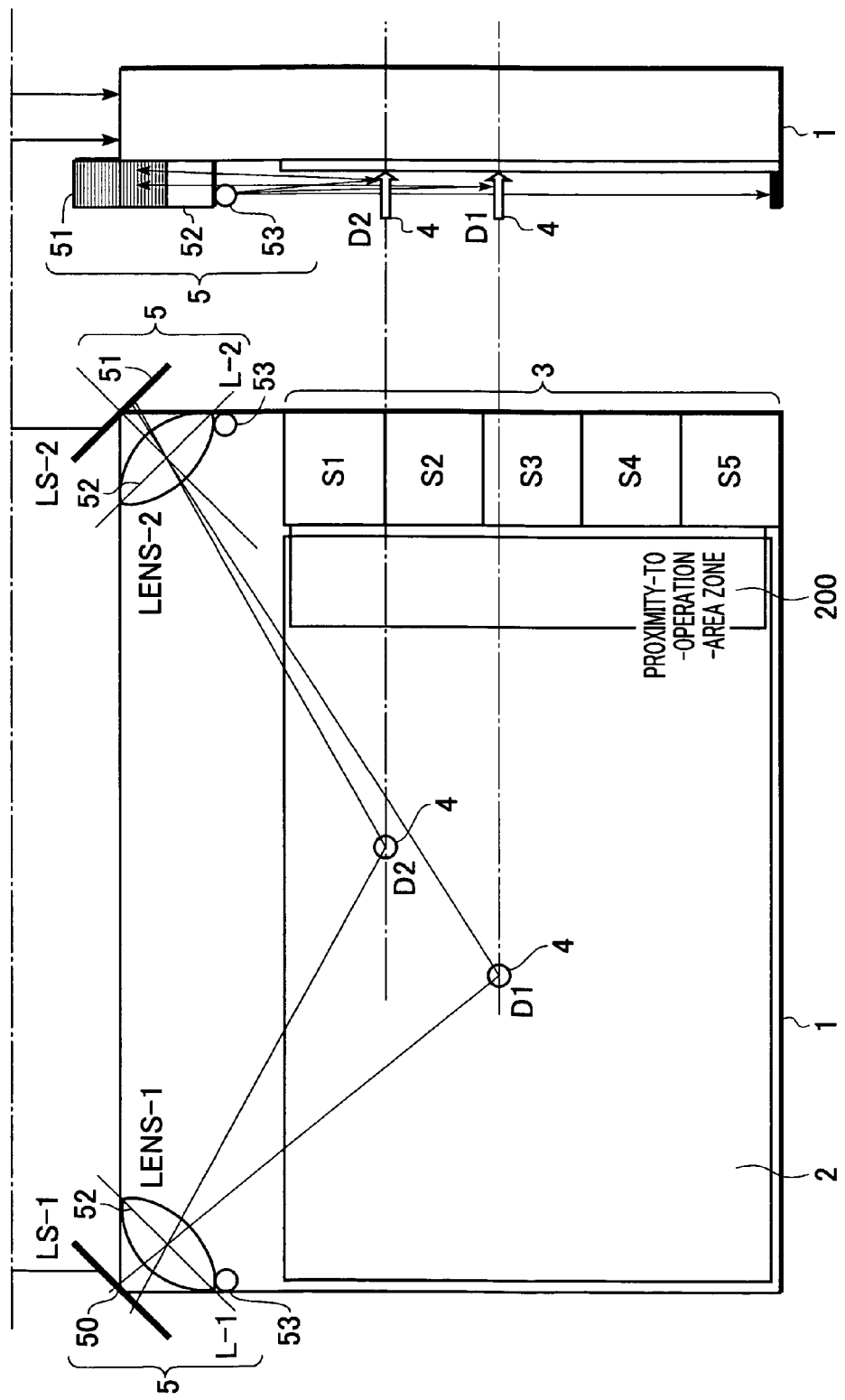

A description of the configuration of a display-integrated drawing input apparatus according to the third embodiment is omitted since the apparatus is similar to that shown in FIGS. 7A and 7B. The flowchart shown in FIG. 9 illustrates an operation identifying process in accordance with the third embodiment. Steps similar to those shown in FIG. 8 are denoted by identical step numbers.

The operation identifying process in the third embodiment has a feature in detecting a particular pattern in step S801 show in FIG. 9. In other words, although the apparatus according to the third embodiment delays switch operation detection during time T similarly to the second embodiment, the third embodiment has a feature in that only when the drawing pen 4 draws a particular pattern on the operation area 3 does the apparatus according to the third embodiment detect a switch operation. Particular pattern drawing data is stored in the ROM 8 beforehand.

Regarding particular patterns, for example, predetermined shapes, such as continuous circles, quadrangles, and triangles, can be stored in the ROM 8, as particular shapes for operation switch designation by the drawing pen 4. In this case, only when the shape drawn on the operation area 3 is recognized as a particular pattern does the apparatus identify a switch operation.

Also, when the drawing pen 4 unintentionally enters the operation area 3 while being used to perform drawing on the screen section 2, since the drawing pen 4 has a coordinate vector on a direction from the screen section 2 to the operation area 3, vector information concerning the direction is stored in the ROM 8 beforehand, and if a movement of the drawing pen 4 matches the vector, it is also useful that the apparatus controls the operation identifying process not to recognize the movement.

In addition, when the drawing pen 4 produces a coordinate vector in a direction from the operation area 3 to the screen section 2, it may be determined that a switch operation is to be executed.

As described above, only when input coordinates represent a particular pattern does the third embodiment execute a switch operation. The particular pattern includes a particular shape pattern, vector information of a vector from the operation area 3 to the screen section 2 (drawing area), or vector information different from information of a vector from the drawing area to the operation area 3.

As described above, according to the third embodiment, by using the drawing pen 4 to draw a particular pattern on the operation area 3, designation of one switch by the user can be ensured. This enables appropriate determination of an operation switch.

Other Embodiments

The embodiments of the present invention can include, for example, a system, an apparatus, a method, a program, and a storage medium. Specifically, the present invention may be applied either to a system constituted by plural units (e.g., a host computer, an interface unit, a reader, a printer, etc.) or to an apparatus (e.g., a photocopier, a facsimile machine, or the like) formed by a single unit.

In addition, a system or an apparatus can be supplied with a storage medium containing the program code of software for implementing the functions of the above-described embodiments and the program code in the storage medium is read and executed by a computer (or a central processing unit (CPU) or micro-processing unit (MPU)) of the system or apparatus.

In this case, the program code read from the storage medium implements the functions of the above-described embodiments.

As the storage medium for supplying the program code, for example, a floppy disk, a hard disk, an optical disk, a magneto-optical disk, a compact-disk read-only memory, a magnetic tape, a nonvolatile memory card, a read-only memory, or the like, can be used.

In addition, based on instructions of the program code, an operating system, or the like, which operates on the computer, performs part of the processing, and the processing implements the functions of the above-described embodiments.

Moreover, the program code read from the storage medium may be written in a memory provided in an add-in board set in the computer or an add-in unit connected to the computer. In such a case, all or part of the processing can be performed based on instructions of the program code by a CPU or the like which is provided in the add-in board or unit and the functions of the above-described embodiments are implemented by the processing.

As described above, according to the present invention, the display-integrated drawing input apparatus enables drawing and operations intended by the user.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A coordinate input control method for a display-integrated coordinate input apparatus which includes a display having thereon a first area and a second area, and a coordinate-input means that inputs coordinates on the display, the coordinate input control method comprising:
   determining if the coordinates input by the coordinate input means are on the second area, wherein the first area is a drawing area and processing on the first area is drawing, and the second area includes at least one switch and processing on the second area is an operation on a respective one of the switches on the second area;
   if it is determined that the coordinates input by the coordinate input means are on the second area, determining if the coordinates on the second area have been consecutively input since drawing on a proximity area, wherein the proximity area is a region on the first area in proximity to the second area;
   if it is determined that the coordinates on the second area have been consecutively input since drawing on the proximity area, delaying detection of an operation on the respective switch for a predetermined amount of time; and
   executing an operation on the respective switch when the coordinates on the second area have not been consecutively input since the drawing on the first area.

2. A coordinate input control method according to claim 1, wherein, determining if the coordinates on the second area have been consecutively input is determined based on a predetermined number of coordinates input in an adjacent past prior to the coordinates on the second area.

3. A coordinate input control method according to claim 1, further comprising, after the detection of the operation on the switch is delayed for the predetermined amount of time, if the coordinates on the second area represent designation of the operation on the respective switch, executing the operation of the respective switch.

4. A coordinate input control method according to claim 3, wherein, executing the operation of the respective switch is performed when the coordinates on the second area represent a particular pattern.

5. A coordinate input control method according to claim 4, wherein the particular pattern is a pattern of a particular shape.

6. A coordinate input control method according to claim 4, wherein the particular pattern is information of a vector from the second area to the first area.

7. A coordinate input control method according to claim 4, wherein the particular pattern is vector information different from information of a vector from the first area to the second area.

8. A coordinate input control method according to claim 1, wherein the first area and the second area are provided on substantially the same plane of the display.

9. A coordinate input control method according to claim 1, wherein the display-integrated coordinate input apparatus further includes drawing means, and the coordinate input means emits radiation substantially parallel to the surfaces of the first area and the second area and performs coordinate detection based on radiation reflected by the drawing means.

10. A control program for controlling a display-integrated coordinate input apparatus including a display having thereon a first area and a second area, and a coordinate-input means for inputting coordinates on the display,
    wherein said control program is loaded and executed in a computer, whereby a coordinate input control method as set forth in claim 1 is implemented for the display-integrated coordinate input apparatus.

11. A display-integrated coordinate input apparatus comprising:
    a display having thereon a first area and a second area including a proximity region on the first area and in proximity to the second area;
    coordinate-input means for inputting coordinates on said display;
    determining means for determining if the coordinates input by the coordinate input means are on the second area;
    consecutiveness determining means for determining, when said determining means determines that the input coordinates are on the second area, whether the coordinates on the second area have been consecutively input since drawing on the proximity area;
    a delay timer; and
    delaying means for controlling the delay timer to delay detection of operation on the switch for a predetermined amount of time when said consecutiveness determining means determines that the coordinates on the second area have been consecutively input since drawing on the proximity area.

12. A display-integrated coordinate input apparatus according to claim 11, wherein the first area is a drawing area and processing on the first area is drawing, and the second area is an operation area comprising at least one switch and processing on the second area is execution of an operation associated with a respective one of the at least one switch provided on the second area.

13. A display-integrated coordinate input apparatus according to claim 11, further comprising a pattern detector for determining if the coordinates on the second area represent a particular pattern, and if the coordinates on the second area represent the particular pattern, executing the operation of the switch.

14. A display-integrated coordinate input apparatus according to claim 11, wherein the first area and the second area are provided on substantially the same plane of the display.

15. A display-integrated coordinate input apparatus according to claim 11, further comprising drawing means, and wherein the coordinate-input means emits radiation substantially parallel to surfaces of the first area and the second area and the coordinate-input means performs coordinate detection based on radiation reflected by the drawing means.

* * * * *